United States Patent
Hashizume et al.

(10) Patent No.: US 8,189,796 B2
(45) Date of Patent: May 29, 2012

(54) VOICE RESPONSE SYSTEM

(75) Inventors: Hiroshi Hashizume, Tokyo (JP); Shinji Usuba, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1484 days.

(21) Appl. No.: 11/646,345

(22) Filed: Dec. 28, 2006

(65) Prior Publication Data

US 2007/0165867 A1    Jul. 19, 2007

(30) Foreign Application Priority Data

Jan. 19, 2006  (JP) ................................. 2006-011342

(51) Int. Cl.
*H04R 5/00*    (2006.01)
(52) U.S. Cl. ........................................... 381/17; 381/19
(58) Field of Classification Search ................ 381/1, 17, 381/18, 26, 27, 74, 310, 309; 379/202.01; 348/15
See application file for complete search history.

(56) References Cited

U.S. PATENT DOCUMENTS

| | | | |
|---|---|---|---|
| 2003/0081115 A1* | 5/2003 | Curry et al. ................. | 348/14.12 |
| 2003/0098892 A1 | 5/2003 | Hiipakka | |
| 2004/0005066 A1* | 1/2004 | Kraemer ......................... | 381/17 |
| 2004/0087346 A1 | 5/2004 | Johannsen et al. | |
| 2005/0053242 A1* | 3/2005 | Henn et al. ...................... | 381/22 |
| 2005/0147261 A1* | 7/2005 | Yeh ................................. | 381/92 |

FOREIGN PATENT DOCUMENTS

| | | |
|---|---|---|
| GB | 2407934 | 5/2005 |
| JP | 2000-184017 A | 6/2000 |
| JP | 2001-290841 A | 10/2001 |
| JP | 2002-344632 | 11/2002 |
| JP | 2005-101738 A | 4/2005 |
| JP | 2005-184621 A | 7/2005 |
| WO | WO 03007656 A1 * | 1/2003 |

* cited by examiner

*Primary Examiner* — Gerald Gauthier
*Assistant Examiner* — Eugene Zhao
(74) *Attorney, Agent, or Firm* — Rabin & Berdo, P.C.

(57) ABSTRACT

The present invention concerns a voice response system in which a voice response unit sends a monaural voice signal corresponding to a request signal from a communication terminal to the communication terminal. The communication terminal comprises a monaural/stereo conversion portion for converting a monaural voice signal from the voice response unit to a stereo voice signal and a stereo voice outputting portion for outputting a converted stereo voice signal.

8 Claims, 6 Drawing Sheets

|   |   |   |
|---|---|---|
| 1 | 2 | 3 |
| 4 | 5 | 6 |
| 7 | 8 | 9 |
| * | 0 | # |

VOICE RESPONSE SYSTEM

BACKGROUND OF THE INVENTION

1. Field of the Invention

The present invention relates to a voice response system and more particularly to a system in which a voice response apparatus automatically responds to an operation signal or the like from a telephone terminal.

2. Description of the Related Art

Voice response units (apparatus) have been used in reservation systems, educational systems, call centers, promotion systems and the like. In a voice response system using such a conventional voice response unit, the voice response unit reproduces a predetermined or relevant voice signal corresponding to a request by a PB signal transmitted from a telephone terminal such as a remote fixed analog telephone, portable telephone, or IP telephone, or a request through a voice signal (a request grasped by voice recognition) and transmits to the aforementioned telephone terminal so as to produce a voice sound (for example, see Japanese Patent Application Laid-Open No. 2002-344632).

However, in the conventional voice response system, the telephone terminal only outputs voice sound from a voice signal (for example, monaural signal of 3.4 kHz or less) transmitted by the voice response unit.

For example, if the voice response system provides a sales promotion message, often, just outputting a voice sound from the sound signal received by the telephone terminal does not appeal so much. If the voice response system is used in an educational system, just outputting a voice sound from the voice signal received by the telephone terminal does not make people interested in it, thereby possibly dropping the educational effect or reducing a dialogue continuing time.

Accordingly, a voice response system capable of raising the appeal performance to a listener has been demanded strongly.

SUMMARY OF THE INVENTION

To achieve the above-described object, the invention provides a voice response system in which a voice response unit sends a monaural voice signal, corresponding to a request signal from a communication terminal, to the communication terminal, wherein the communication terminal comprises: a monaural/stereo conversion portion for converting the monaural voice signal from the voice response unit to a stereo voice signal; and a stereo voice output portion for outputting the converted stereo voice signal.

The voice response system of the invention is intended to output a response voice from the voice response unit with a stereo voice signal obtained by processing carried out on the side of the communication terminal. Consequently, a dialogue with a voice response attractive for a listener can be made without imposing any load on its communication configuration, thereby improving the frequency of use of the system and the continuity of the dialogue.

BRIEF DESCRIPTION OF THE DRAWINGS

Preferred exemplary embodiments of the present invention will be described in detail based on the following figures, wherein.

DETAILED DESCRIPTION OF THE INVENTION

(A) First Embodiment

Hereinafter, the first embodiment of the voice response system of the present invention will be described with reference to the accompanying drawings.

Figure 1:
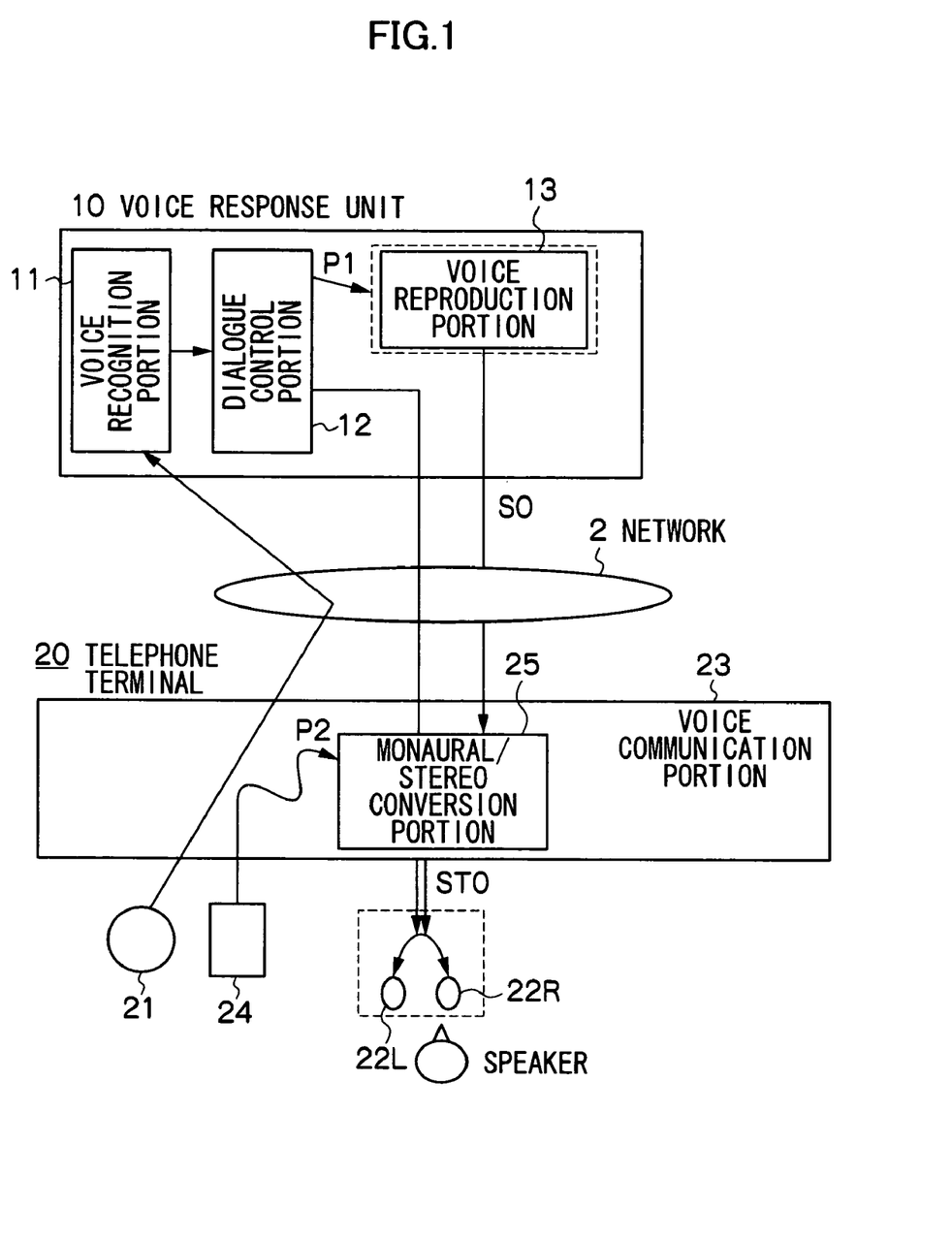
FIG. 1 is a block diagram showing the entire structure of a voice response system of a first embodiment.

FIG. 1 is a block diagram showing the entire structure of the voice response system of the first embodiment. FIG. 1 picks up the structure of the voice response function which is activated when the communication link is established and in other words, the structure of its call control function is omitted.

Referring to FIG. 1, the voice response system 1 of the first embodiment comprises a voice response unit 10 and a telephone terminal 20 which are connected through network 2. The voice response unit 10 comprises a voice recognition portion 11, a dialogue control portion 12 and a voice reproduction portion 13. The telephone terminal 20 includes a microphone 21, a pair of speakers 22R, 22L, a voice communication portion 23 and an assigned position instructing portion 24, and the voice communication portion 23 incorporates monaural/stereo conversion portion 25 for the received voice.

The network 2 may be for example a general analog telephone line or IP network and any line may be used as long as it has a function for establishing and disconnecting a link. As a communication method between the voice response unit 10 and the telephone terminal 20, for example, IP network communication using VoIP may be used. Further, it may be a dedicated line instead of a network. The network 2 may be an integrated network comprising plural networks and part of all of the network may be based on radio communication, such as a portable telephone network. If digital communication is used between the voice response unit 10 and the telephone terminal 20 although representation thereof is omitted in FIG. 1, a conversion circuit between an analog signal and a digital signal or packet assembly/disassembly construction is provided in an interface structure between the voice response unit 10 and the telephone terminal 20 of the network 2.

The voice response unit 10 may be of a type capable of corresponding to a single telephone terminal 20 or of a type capable of corresponding to a plurality of the telephone terminals by parallel processing. In the latter case, this correspondence is carried out by providing pluralities of the voice recognition portions 11 and dialogue control portions 12 (a plurality of the voice reproduction portions 13 may be provided) or by processing software (task) which function as the voice recognition portion 11 and the dialogue control portion 12 in parallel for each link. In any cases, if a link is established, the same condition is established as when the voice recognition portion 11, dialogue control portion 12 and voice reproduction portion 13 are provided for each telephone terminal 20.

The voice response unit 10 may be of any type, such as for education or any other service. That is, in the first embodiment, an application or purpose of the voice response unit 10 is not specified.

In the voice response unit 10, the voice recognition portion 11 recognizes a voice signal given from the telephone terminal 20 and provides a recognition result (for example, text data string) to the dialogue control portion 12. In the case of a voice response system in which a user on the side of the telephone terminal 20 indicates his/her own intention by operating push buttons or function keys, a recognition portion for the PB signal or function key signal is applied instead of the voice recognition portion 11 or in addition to the voice recognition portion 11. In the case of using the function keys, when the function key is pressed, the telephone terminal 20 may convert a relevant PB signal or PB signal string and send it to the voice response unit 10.

The dialogue control portion 12 controls dialogue phase so as to select or to determine a speech code P1 which specifies the content of speech from the voice response unit 10 from a current phase and a recognition result given from the voice recognition portion 11 and gives a speech code 1 to the voice reproduction portion 13.

The voice reproduction portion 13 memorizes a voice signal of speech content with correspondence to each speech code and reproduces a voice signal corresponding to the speech code P1 given from the dialogue control portion 12 and outputs. In the meantime, the dialogue code P1 may be composed of character string for synthesis and a code which instructs the kind of a voice signal to be synthesized to complete a message and that is, the reproduction signal may incorporate partially a character string given from the dialogue control portion 12.

Here, the memory method of the voice signal is not specified. The voice signal may be memorized in a compressed state or, while phonemes and phoneme combination are stored separately, a voice signal may be reproduced by voice synthesis. A reproduction voice signal by the voice reproduction portion 13 is sent to the telephone terminal 20. In the meantime, a background sound signal may be transmitted to the telephone terminal 20 as well as the reproduced voice signal.

The telephone terminal 20 may be any one of various telephone terminals such as an analog telephone, portable telephone, IP telephone (including soft phone), or telephone correspondence type PDA, as long as it has at least the structure shown in FIG. 1 in relation to the feature of the first embodiment.

In the telephone terminal 20, a microphone 21 captures a spoken voice of a speaker and converts it to an electric voice signal to be provided to the voice communication portion 23. The spoken voice of the first embodiment conveys a user's intention to the aforementioned voice response unit 10. In the case of a system which executes out conveyance of the user's intention to the voice response unit 10 not with voice but with the PB signal, the push button (not shown) provided on the telephone terminal 20 is operated to convey the intention.

A pair of speakers 22R, 22L outputs a stereo voice signal given from the voice communication portion 23. The pair of the speakers 22R, 22L may be of headphone type (FIG. 1 indicates this case) or of stereo speaker type. If the microphone 21 and the pair of the speakers 22R, 22L are constructed in the head phone type, the telephone terminal main body and the head phone may be connected via a wired or wireless connection.

The voice communication portion 23 sends a voice signal from the microphone 21 to the voice response unit 10 or receives a voice signal given from the voice response unit 10 and provides the received voice signal to the speakers 22R, 22L. The voice communication portion 23 accommodates the monaural/stereo conversion portion 25.

The monaural/stereo conversion portion 25 converts the voice signal (monaural voice signal) S0 given from the voice response unit 10 to a stereo voice signal ST0 with directivity and sense of distance according to existing monaural/stereo conversion technology (for example, see Japanese Patent Application Laid-Open No. 2003-102099) and the converted stereo voice signal ST0 is provided to the speakers 22R, 22L. The monaural/stereo conversion portion 25 of the first embodiment converts a sound source position (assigned position) of the stereo voice signal ST0 to a stereo voice signal ST0 whose position is specified. If the sound signal and background sound signal are provided from the voice response unit 10 (for example, transmitting by changing the packet corresponding to a signal or by changing the field with a signal despite the same packet), the voice communication portion 23 provides only the voice signal to the monaural/stereo conversion portion 25 and converts only the voice signal to a stereo signal.

Figure 2:
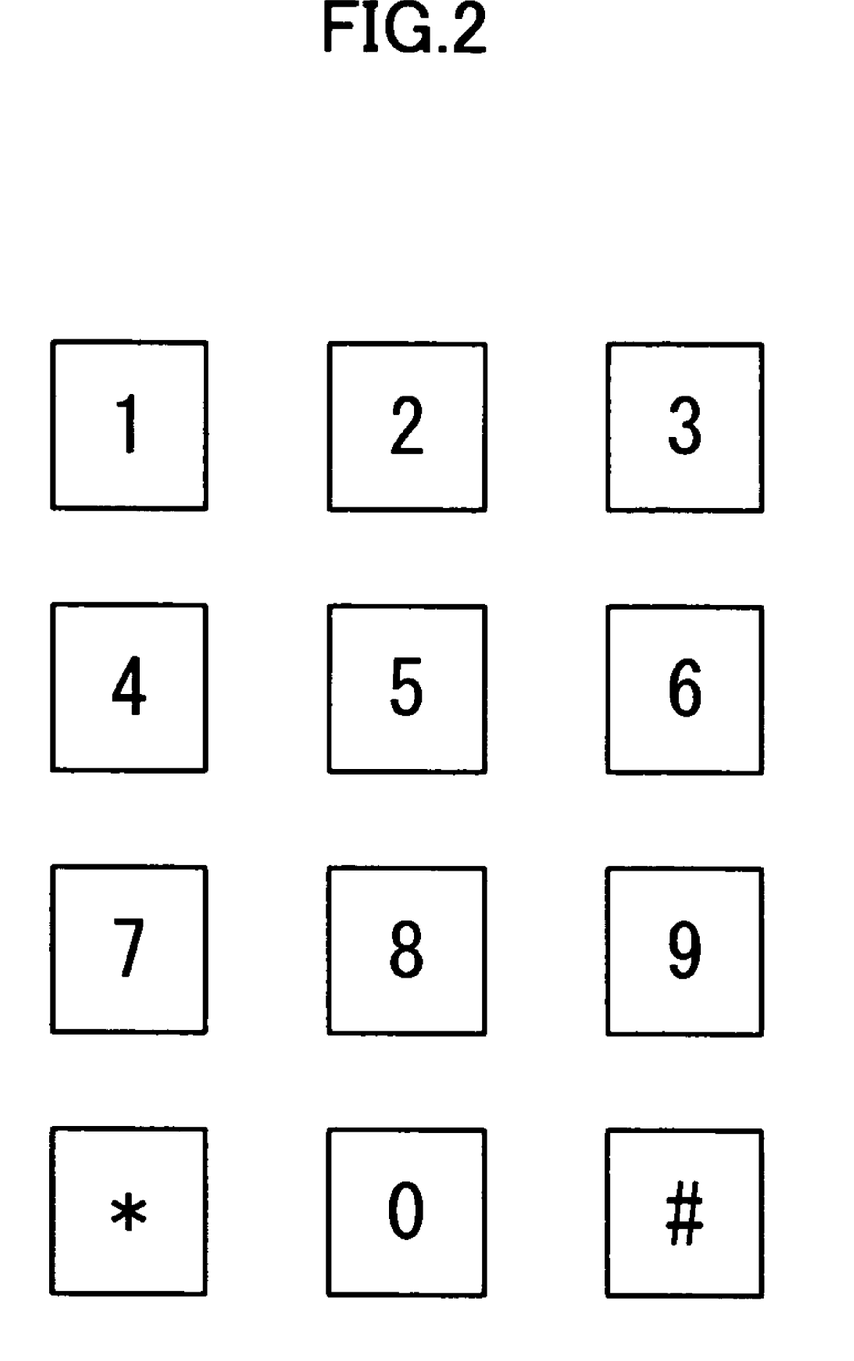
FIG. 2 is an explanatory diagram of an assigned position instructing portion of the telephone terminal of the first embodiment.

The assigned position instructing portion 24 instructs an assigned position to the monaural/stereo conversion portion 25 corresponding to a user's operation. As the assigned position instruction portion 24, for example, a device using a mouse may be used (for example, in the case where the telephone terminal 20 is a soft phone). The telephone terminal 20 having a ten key (including devices achieved with a touch panel) can use the ten key as the assigned position instructing portion 24. For example if the ten key is in the arrangement shown in FIG. 2, a single operation of any key around "5" can be used to indicate a position change by a unit quantity in a direction connecting the "5" with that ten key. For example, if "4" is operated, it is understood as an instruction for changing the assigned position by a unit amount in the leftward direction.

Referring to FIG. 1, speech code P1 is inputted to the voice reproduction portion 13 by the dialogue control portion 12 in agreement with a progress of the dialogue between a speaker and the voice response unit 10 and monaural voice signal S0 reproduced by the voice reproduction portion 13 is given to the telephone terminal 20. In the telephone terminal 20, its monaural voice signal S0 is inputted to the monaural/stereo conversion portion 25 and the monaural voice signal S0 is converted to a stereo voice signal ST0 with directivity with an assigned position from the assigned position instructing portion 24 as a sound source according to the existing monaural/stereo conversion technology by the monaural/stereo conversion portion 25. This stereo voice signal ST0 is outputted from a pair of the speakers 22R, 22L.

According to the first embodiment, the assigned position can be changed according to the speaker's intention so that sound from the voice response unit can be listened to as stereo sound with a directivity and a sense of distance which the speaker likes. The speaker can sustain dialogue with a high sense of realism because he or she can move the directivity continuously by listening to sound near the ear or listening sound from a little further away. As a result, a dialogue which is interesting for the speaker is enabled, so that the frequency of use of the voice response system is raised and it can be expected that the conversation can be continued until a termination point of time which the voice response system intends.

That is, voices, sound effects and environmental sounds reproduced by the speaker (listener) can be provided with directivity and stereoscopic effect by the functions of the voice response unit and telephone terminal connected at a far away position thereby enabling a more attractive dialogue of the voice response system than conventionally.

Because the voice signal sent from the voice response unit to the speaker (telephone terminal) is a monaural voice signal, there exists little load applied to the network in order to exert the aforementioned effect. Further, because the monaural/stereo conversion portion is located on the speaker side, processing of the voice response unit can be reduced.

(B) Second Embodiment

Next, the second embodiment of the voice response system of the invention will be described about mainly a different point from the first embodiment with reference to the accompanying drawings.

Figure 3:
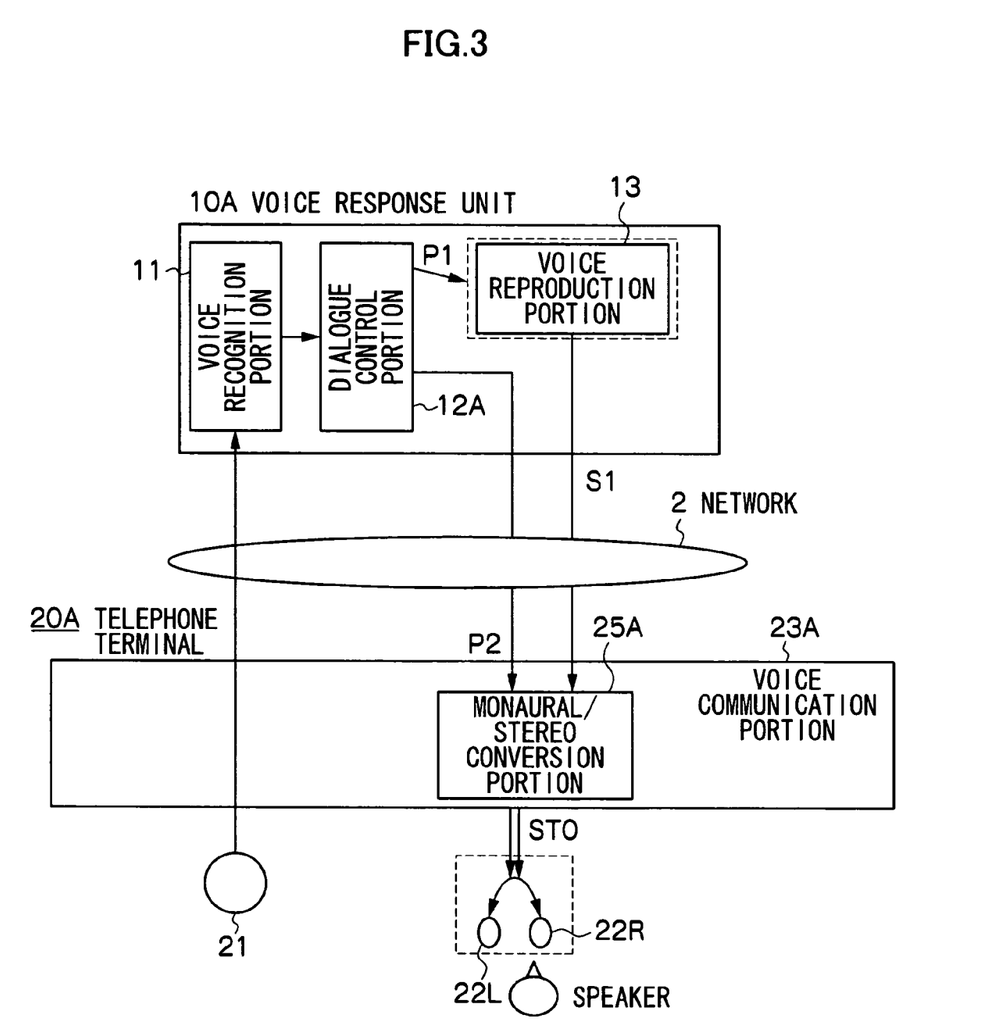
FIG. 3 is a block diagram showing the entire structure of the voice response system of a second embodiment.

FIG. 3 is a block diagram showing the entire structure of the voice response system of the second embodiment and the same components as, or corresponding components to, the first embodiment shown in FIG. 1 are provided with the same or corresponding reference numerals.

Referring to FIG. 3, a voice response system 1A of the second embodiment is different from the first embodiment in (1) that the assigned position instructing portion 24 is omitted from the telephone terminal 20A, (2) that the dialogue control portion 12A of the voice response unit 10A not only provides the speech code P1 to the voice reproduction portion 13 but also transmits an assigned position parameter P2 to the telephone terminal 20A, and (3) that the monaural/stereo conversion portion 25A of the telephone terminal 20A fetches in a signal sent by the dialogue control portion 12A of the voice response unit 10A as a necessary assigned position parameter.

For example, the assigned position parameter is correlated to each speech code controlled by the dialogue control portion 12A and when the dialogue control portion 12A determines the speech code P1 to be provided to the voice reproduction portion 13 corresponding to a progress of the dialogue, it sends an assigned position parameter P2 correlated to the speech code P1 to the telephone terminal 20A.

Although the speech code P1 and assigned position parameter P2 are stored in the dialogue control portion 12A corresponding to the phase of dialogue, the speech code P1 and the assigned position parameter P2 do not need to be outputted synchronously. For example, when a single speech code P1 is outputted, a plurality of the assigned position parameters P2 may preferably be outputted successively. Further, it is preferable that a time interval for sending the assigned position parameter P2 is at so narrow an interval that when the speaker listens to the stereo voice signal ST0 after conversion, it is felt that the directivity and sense of distance change continuously.

Consequently, the telephone terminal 20A is supplied with the monaural voice signal S1 and the assigned position parameter P2 corresponding to the speech code P1 from the voice response unit 10A. Here, the monaural voice signal S1 and the assigned position parameter P2 may be sent through different channels (for example, sent through different IP packets) or may be multiplex transmitted through the same channel (for example, transmitted by inserting into different field of the same IP packet).

The monaural/stereo conversion portion 25A of the telephone terminal 20A uses the assigned position parameter P2 which the voice response unit 10A sends as assigned position information for specifying its sound source position when a given monaural voice signal S1 is converted to the stereo voice signal ST0.

The operation of the voice response system 1A of the second embodiment is the same as the first embodiment except for the above described points.

An educational system will be described as an example of an application of the voice response system 1A of the second embodiment. Assume that teacher A and teacher 13 exist as teachers (the voice response unit 10A), and that these two teachers teach a student (i.e., a speaker). When a voice signal of one teacher A is outputted corresponding to a progress of educational dialogue, a voice signal indicating the left position is outputted as assigned position parameter P2 and when a voice signal of the other teacher B is outputted, a voice signal indicating the right position is outputted as assigned position parameter P2. As a consequence, the voice of the teacher A is provided to the student from the left side and the voice of the teacher B is provided from the right side.

Although a case where the dialogue control portion 12A sends the assigned position parameter P2 to the telephone terminal 20A is indicated above, it is permissible to store the assigned position parameter correlated to each voice signal in the voice reproduction portion 13 and when the voice reproduction portion 13 is supplied with the speech code P1, send the voice signal S1 and assigned position parameter P2 corresponding to the speech code P1.

The second embodiment can exert the following effects in addition to substantially the same effect as the first embodiment. That is, the assigned position of the voice from the voice response unit changes without any operation by the speaker thereby enabling a dialogue with a high sense of realism. For example, by automatically reproducing the assigned position change decided by intention of a designer or manufacturer of content (story of dialogue) preliminarily, the speaker can be made to experience a dialogue with a high sense of realism.

(C) Third Embodiment

Next, the third embodiment of the voice response system of the invention will be described about a different point from the first embodiment with reference to the accompanying drawings.

Figure 4:
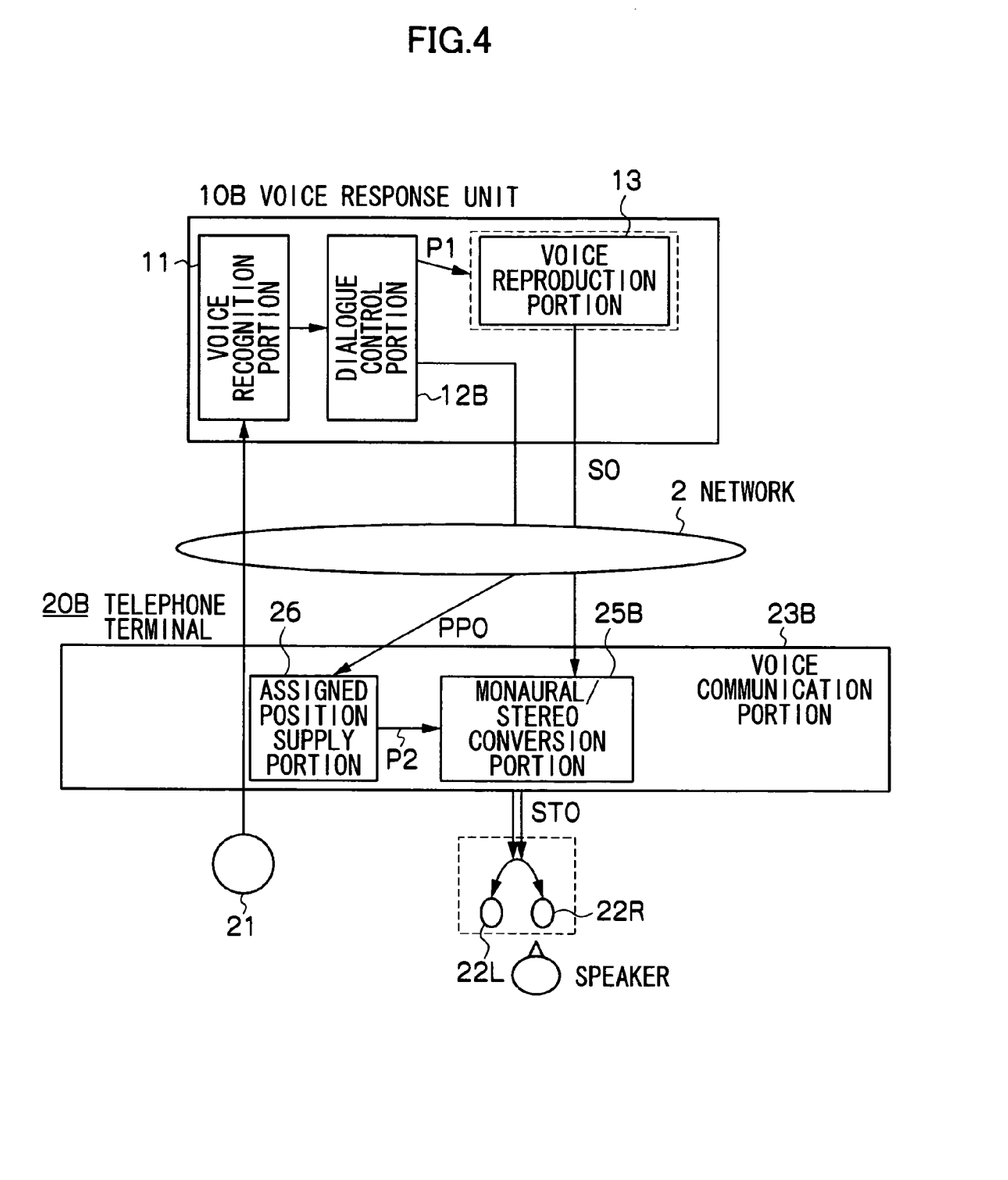
FIG. 4 is a block diagram showing the entire structure of the voice response system of a third embodiment.

FIG. 4 is a block diagram showing the entire structure of the voice response system of the third embodiment and the same components as or corresponding components to the first embodiment shown in FIG. 1 are provided with the same or corresponding reference numerals.

Referring to FIG. 4, a voice response system 1B of the third embodiment is different from the first embodiment in (1) that the assigned position instructing portion 24 is omitted from the telephone terminal 20B, (2) that the dialogue control portion 12B of the voice response unit 10B not only provides the speech code P1 to the voice reproduction portion 13 but also transmits an assigned position parameter PP0 to the telephone terminal 20B, (3) that an assigned position supply portion 26 which outputs the assigned position parameters of the assigned position pattern specified by the assigned position pattern code PP0 given by accommodating a plurality of assigned position patterns composed of time series of the assigned position parameters is provided within a voice communication portion 23B of a telephone terminal 20B, and (4) that the monaural/stereo conversion portion 25A fetches in an assigned position parameter supplied by the assigned position supply portion 26 as a necessary assigned position parameter.

A plurality of assigned position parameter change patterns are defined in the assigned position supply portion 26. As the assigned position pattern, for example, a pattern in which the sound source position rotates to the right direction, a pattern in which the sound source leaves, a pattern in which the sound source approaches and the like are prepared in various ways.

An assigned position pattern code is correlated to each speech code controlled by the dialogue control portion 12B and if the dialogue control portion 12B determines the speech code P1 to be given to the sound reproduction portion 13 corresponding to a progress of the dialogue, the assigned position pattern code PP0 correlated to the speech code P1 is sent to the telephone terminal 20B.

The monaural voice signal S1 and assigned position pattern code PP0 corresponding to the speech code P1 are provided to the telephone terminal 20B from the voice response unit 10B. Here, the monaural voice signal S1 and assigned position pattern code PP0 may be transmitted through separate channels (for example, sent through different IP packets) or multiplex transmitted through the same channel (for example, transmitted by inserting into different field of the same IP packet).

If the assigned position supply portion 26 of the telephone terminal 20B is supplied with the assigned position pattern code PP0, the assigned position supply portion 26 outputs the assigned position parameter P2 which is an assigned position pattern determined by that code to the monaural/stereo conversion portion 25B successively. Here, the assigned position parameter may be changed at a predetermined cycle based on a clock signal (not shown) or each assigned position parameter may be outputted to the assigned position pattern corresponding to the output timing including the output timing (for example, described with the quantity of clocks since start of operation) of each assigned position parameter.

When converting the monaural voice signal S1 given by the voice response unit 10B to the stereo voice signal ST0, the monaural/stereo conversion portion 25B uses the assigned position parameter P2 supplied by the assigned position supply portion 26 as an assigned position parameter for specifying that sound source.

The operation of the voice response system 1B of the third embodiment is the same as the first embodiment except for the above-described points.

The third embodiment can exert the same effect as the second embodiment. The third embodiment can achieve assignement change by reducing the processing of the dialogue control portion and the load applied to the network because it sends the assigned position pattern code as compared with the second embodiment.

(D) Fourth Embodiment

Next, the fourth embodiment of the voice response system of the invention will be described with reference to the accompanying drawings.

Figure 5:
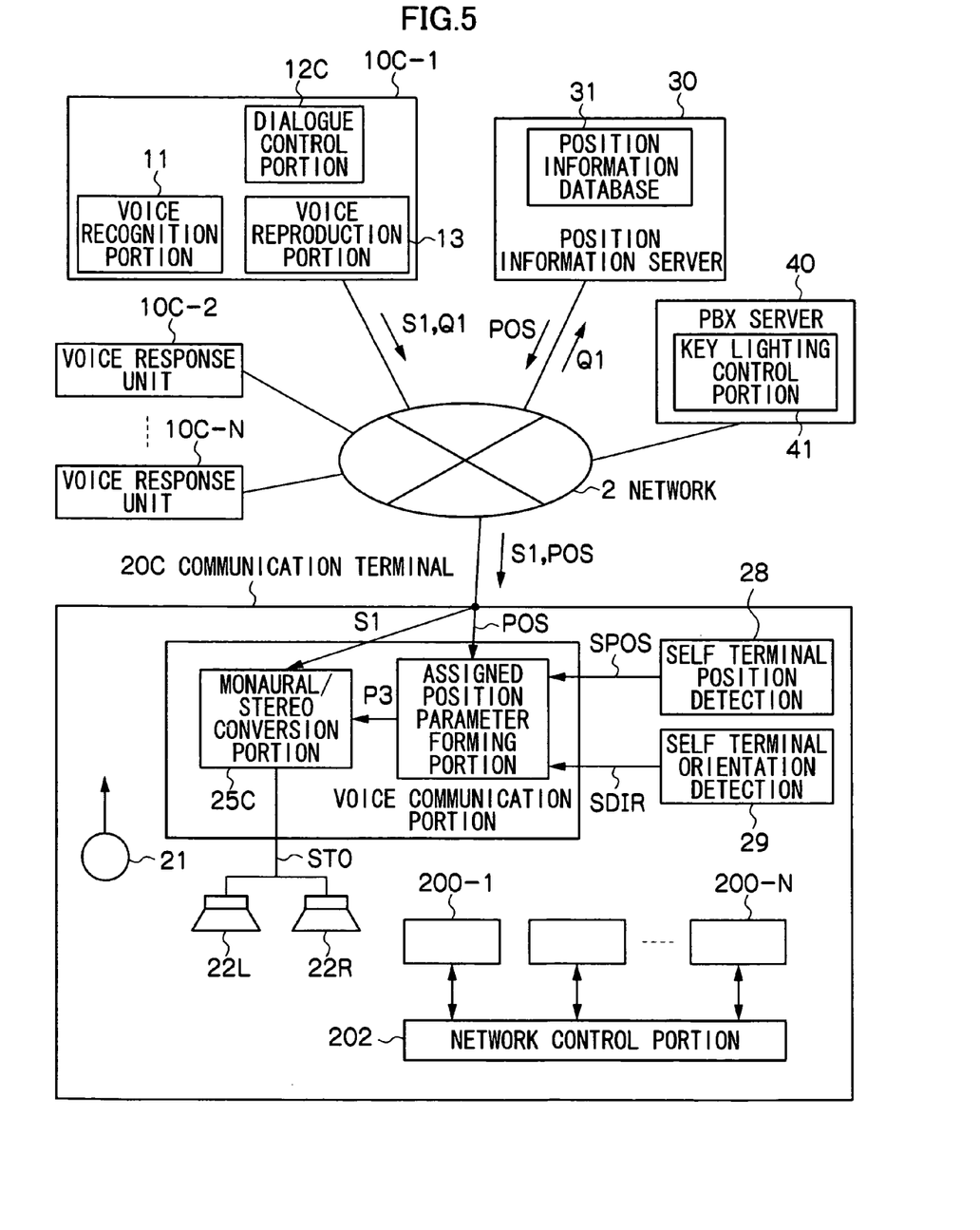
FIG. 5 is a block diagram showing the entire structure of the voice response system of a fourth embodiment.
Figure 6:
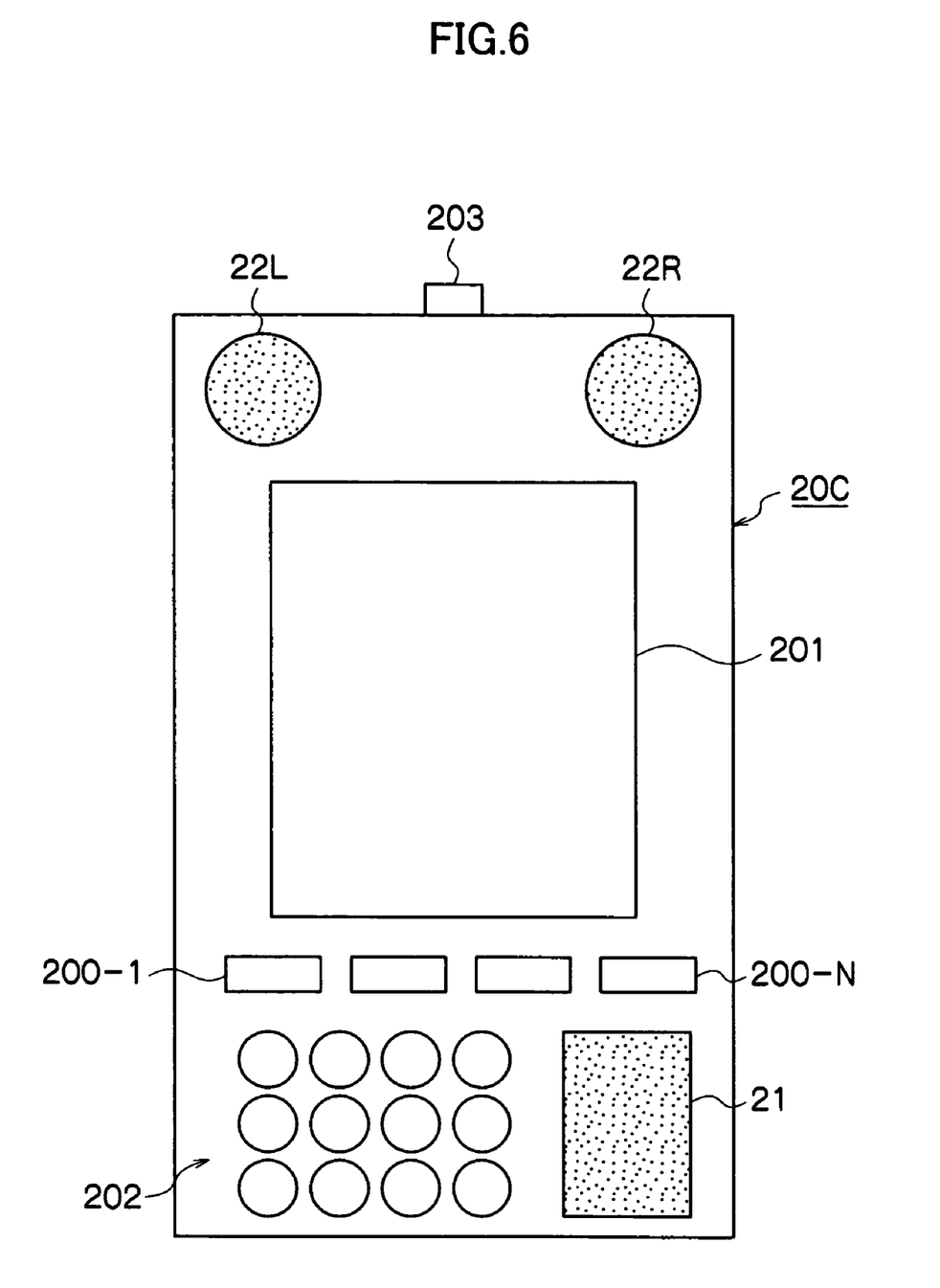
FIG. 6 is a perspective view showing an example of appearance of telephone terminal of the fourth embodiment.

FIG. 5 is a block diagram showing the entire structure of the voice response system of the fourth embodiment and the same components as or corresponding components to the first embodiment shown in FIG. 1 are provided with the same or corresponding reference numerals. FIG. 6 is a perspective view showing an appearance of the telephone terminal of the fourth embodiment.

Referring to FIG. 5, the voice response system 1C of the fourth embodiment includes a plurality of voice response units 10C-1 to 10C-N, communication terminal 20C, position information server 30 and PBX server 40.

Each voice response unit 10C (10C-1 to 10C-N) has the voice recognition portion 11, dialogue control portion 12C and voice reproduction portion 13 like the first embodiment. The voice recognition portion 11 and the voice reproduction portion 13 are the same as the first embodiment.

The fourth embodiment is the same as the first embodiment in that the dialogue control portion 12C of the fourth embodiment specifies the speech code P1 corresponding to the phase of a dialogue just before and result of recognition and gives the speech code P1 to the voice reproduction portion 13. The dialogue control portion 12C gives a position inquiry code Q1 to the position information server 30.

For example, if a voice signal from the communication terminal 20C is about an inquiry asking "where is a product A?", the dialogue control portion 12C gives a speech code P1 indicating a voice signal having a content saying "here it is" to the voice reproduction portion 13, or the dialogue control portion 12C gives a character string "product A" for synthesis and a speech code P1 indicating a voice signal of a content saying "here it is" and, at the same time, gives a position inquiry code Q1 asking the position of the product A to the position information server 30.

In the meantime, communication between the voice response unit 10C and the position information server 30 may be carried out through the network 2 or through a dedicated line.

The position information server 30 includes a communication portion (not shown) and a position information database (position information DB) 31. The position information database 31 sends back position information POS corresponding to an inquiry when receiving the position inquiry code Q1. This position information POS is provided finally to the communication terminal 20C. With specific information of the communication terminal 20C added to the position inquiry code Q1, the position information server 30 may send the position information directly to the communication terminal 20C based on its added specific information. The position information server 30 may send back the position information POS to the voice response unit 10C which is a sender of the position inquiry code Q1 and the voice response unit 10C may send the position information POS to the communication terminal 20C. Further, when a link between the voice response unit 10C and the communication terminal 20C is established, the position information server 30 may send the position information POS to the communication terminal 20C with a link state which enables communication among three parties including the position information server 30 to be established.

The communication terminal 20C of the fourth embodiment has a structure like a PDA or handy terminal as shown in FIG. 5. The communication terminal 20C of the fourth embodiment includes a microphone 21, a pair of speakers 22R, 22L and a voice communication portion 23C and further, a self terminal position detection portion 27, a self terminal orientation detection portion 28, N one-touch transmission buttons 200-1 to 200-N and a network control portion 202. The voice communication portion 23C has a monaural/stereo conversion portion 25C and an assigned position parameter forming portion 29. Additionally, a head phone jack receiving portion 203 which a display 201, various input keys 202 and stereo correspondence head phone can be attached thereto/removed therefrom are provided as shown in FIG. 5 although not described in detail.

The microphone 21 and the pair of speakers 22R, 22L are the same as in the first embodiment. In the meantime, the pair of the speakers 22R, 22L are moved into a state which prohibits their operation if a head phone (not shown) is installed to the head phone jack receiving portion 203.

The self terminal position detection portion 27 detects the position of the communication terminal 20C and provides detected self terminal position information SPOS to the assigned position parameter forming portion 29. As the self terminal position detection portion 27, for example, GPS processing unit may be adopted.

The self terminal orientation detection portion 28 detects an orientation of the communication terminal 20C and provides detected self terminal orientation information SDIR to the assigned position parameter forming portion 29. As the self terminal orientation detection portion 28, for example, an orientation detecting unit using a gyro may be adopted.

When converting the monaural voice signal S1 given from the voice response unit 10C to the stereo voice signal ST0, the monaural/stereo conversion portion 25C of the fourth embodiment uses the assigned position parameter P3 formed by the assigned position parameter forming portion 29 as an assigned position parameter for specifying its sound source position.

The position information POS outputted by the position information server 30, the self terminal position information SPOS outputted by the self terminal position detection portion 27 and the self terminal orientation information SDIR outputted by the self terminal orientation detection portion 28 are provided to the assigned position parameter forming portion 29. The assigned position parameter forming portion 29 determines a distance and orientation to a position indicated by the position information POS with respect to the communication terminal 20C based on inputted information and forms an assigned position parameter P3 which can make the position and orientation of the sound source position of the stereo voice signal ST0 agree with the determined ones and then provides the parameter to the monaural/stereo conversion portion 25C.

The assigned position parameter forming portion 29 (or the self terminal position detection portion 27 and self terminal orientation detection portion 28) may convert information about the position and orientation of the detected communication terminal 20C to information about the position and orientation of a speaker. Assuming that the speaker is operating the communication terminal 20C in the center of his/or her chest by gripping it toward the speaker, the position and orientation of the speaker may be obtained by correcting the detection position and detection orientation.

Respective one-touch transmission buttons 200-1 to 200-N correspond to any of the voice response units 10C-1 to 10C-N one to one and pressing of any of the buttons 200-1 to 200-N is given to the network control portion 202 to supply an establishment of a link of the corresponding voice response units 10C-1 to 10C-N. In the fourth embodiment, the respective one-touch transmission button buttons 200-1 to 200-N incorporate LED device so as to notify of the condition of network. Lighting, blinking and turning off of the incorporated LED device is controlled by the network control portion 202.

The network control portion 202 controls establishment or disconnection of a communication link with the voice response unit 10C and controls lighting, blinking and turning off of the LED device incorporated in the one-touch transmission buttons 200-1 to 200-N according to a current network condition or an instruction from the upper PBX server 40.

When any of the one-touch transmission buttons 200-1 to 200-N is pressed, the network control portion 202 executes establishing operation of the link with the corresponding voice response units 10C-1 to 10C-N. When LED control information for instructing update of the content is given from the upper PBX server 40, the network control portion 202 turns on a corresponding LED device in an update notifying mode for notifying update of the content. For example, the LED is made to blink or a LED device having a color not used for notifying normal network condition is made to light.

The PBX server 40 handles the voice response units 10C-1 to 10C-N and the communication terminal 20C as an extension terminal. The PBX server 40 functions as, for example, IP-PBX server. According to the fourth embodiment, the PBX server 40 has a key lighting control portion 41 which, when an input saying that dialogue information (for example, in case of a voice response unit for advertisement notification, advertisement message) is made, instructs the communication terminal 20C to notify in the update notifying mode only in a predetermined period of time (for example, an hour) since that time. The key lighting control portion 41 is in substantially the same structure as the lighting control structure of a multi-function key possessed by a general PBX unit. For example, it can instruct lighting by using an SIP SUBSCRIBE message.

In the voice response system 1C of the fourth embodiment having the above-described structure, a user (speaker) who desires to acquire any information presses the one-touch transmission buttons 200 (200-1 to 200-N) of the corresponding voice response unit 10C of the communication terminal 20C. This pressing establishes a communication link between the communication terminal 20C and the voice response unit 10C.

Because the one-touch transmission button 200 corresponding to the voice response unit 10C whose content is changed is illuminated in the update notifying mode when not so long a period elapses since update, it is considered that many users get interested in that illumination and presses the one-touch transmission button 200.

When a communication link between the communication terminal 20C and voice response unit 10C is established, a dialogue is executed between the speaker (communication terminal 20C) and the voice response unit 10C. If voice signal (monaural voice signal) S0 is given to the communication terminal 10C from the voice response unit 10C in such a dialogue condition, the position information POS of a sound source relating to the voice signal S0 send by the position information server 30 is also given.

The assigned position parameter forming portion 29 of the communication terminal 10C determines a distance and an orientation to a position indicated by the position information POS with respect to the communication terminal 20C based on the position information POS outputted by the position information server 30, self terminal position information SPOS outputted by the self terminal position detection portion 27 and self terminal orientation information SDIR outputted by the self terminal orientation detection portion 28, and forms an assigned position parameter P3 and gives it to the monaural/stereo conversion portion 25C. The monaural/stereo conversion portion 25C converts the voice signal (monaural voice signal) S0 from the voice response unit 10C to stereo voice signal ST0 according to this assigned position parameter P3 and gives the stereo voice signal to the speakers 22L, 22R in order to make voices.

The position (distance and orientation up to a sound source) of a sound source of this produced stereo voice signal ST0 turns to a position indicated by the position information POS with respect to the communication terminal 20C.

For example, if the speaker inquires saying "where is the product A?", the stereo voice signal ST0 which can be listened as being produced from a direction of a position in which the product A exists is produced.

The fourth embodiment also realizes a voice response system capable of providing a voice having high realistic sensation to the speaker (user).

Because according to the fourth embodiment, establishment of a link with a desired voice response unit can be started by the one-touch button, an excellent operability can be secured.

Further, the fourth embodiment can meet an application of the voice response system in which the speaker searches for a sound source position because it does not use an assigned position parameter determined preliminarily but an assigned position parameter determined considering the position and the orientation of the communication terminal.

(E) Other Embodiments

Although the various embodiments have been referred to in the above description, further embodiments can be exemplified as follows.

Although the telephone terminals (or communication terminals) of the respective embodiments are different in terms of the supply method of the assigned position parameter, a telephone terminal capable of corresponding to a supply method of a plurality of assigned position parameters may be adopted. For example, the supply method of an assigned position parameter for use is determined by negotiation when a link between the telephone terminal and voice response unit is established.

Although in the respective embodiments, an embodiment for converting monaural voice signal to 2-channel stereo voice signal has been indicated, it may be converted to a stereo voice signal having more than two channels.

Although in the above respective embodiments, an embodiment in which the voice recognition portion is equipped with a voice response unit has been indicated, in the case of an enclosed voice response system, it is permissible to provide the telephone terminal (or communication terminal) with a voice recognition portion so as to send out a recognition result to the side of the voice response unit.

Further, although in the first-third embodiments, an embodiment in which the terminal is a telephone terminal has been indicated, the terminal may be one provided with no telephone function as long as it has a voice communication function. For example, if the voice response unit and communication terminal are of the same components of a LAN, the terminal does not need to be provided with a telephone function.

Although as the third embodiment, an embodiment in which a telephone terminal is provided fixedly with an assigned position pattern has been indicated, it is permissible to download an assigned position pattern from the voice response unit to a telephone terminal so that the telephone terminal possesses the assigned position pattern just after a communication link between the voice response unit and telephone terminal is established. The download timing may be other timing than the above mentioned one or a downloading object may be another unit than the voice response unit.

Although as the second embodiment, an embodiment in which the assigned position parameters are changed over when they are provided from the voice response unit to the telephone terminal has been indicated, as described in the third embodiment, it is permissible to provide a single assigned position pattern to the telephone terminal and change over the assigned position parameters successively on the side of the telephone terminal.

Although as the fourth embodiment, an embodiment in which the voice response unit and position information server are provided separately has been indicated, it may include both functions of the voice response unit and the position information server.

Although as the fourth embodiment, an embodiment in which the communication terminal acts as an extension terminal of the PBX server so as to accept control of the LED device of the one-touch button has been indicated, it is permissible to adopt a technical philosophy of controlling lighting of the LED device of the one-touch button of a communication terminal even in other than the PBX system by means of an external unit. For example, a proxy server or registration server of the IP telephone system may bear the same control function as the above-described PBX server. Further, the above-described PBX server function may be born by the voice response unit. For example, when the content is changed, the voice response unit relevant to that content may control the LED device of the one-touch button of an accessible communication terminal.

As a modification of the fourth embodiment, the communication terminal may be changed from an application execution state to a voice response mode.

If it is intended to provide a listener with a higher localization of sound by means of the stereo voice signal after conversion although not mentioned in the respective embodiments, preferably, the band of the monaural voice signal is about 7 kHz. Thus, the invention is more preferable for a system adopting the IP telephone network using wide band voice coding than using a general analog telephone network.

What is claimed is:

1. A voice response system in which a voice response unit sends a monaural voice signal, corresponding to a request signal from a communication terminal, to the communication terminal, wherein the communication terminal comprises:
   a monaural/stereo conversion portion configured to convert the monaural voice signal from the voice response unit to a stereo voice signal wherein the communication terminal is configured to output the converted stereo voice signal, and
   wherein the voice response unit includes a pattern type sending portion for sending assigned position pattern type information determined corresponding to the monaural voice signal to be sent to the communication terminal, and the communication terminal includes an assigned position supply portion which has a plurality of assigned position patterns composed of time-series of assigned position parameters for specifying a sound source position in the stereo voice signal after conversion and successively supplies assigned position parameters of an assigned position pattern determined by the type information provided from the voice response unit to the monaural/stereo conversion portion.

2. The voice response system according to claim 1, wherein the communication terminal further comprises an assigned position instruction portion that provides to the monaural/stereo conversion portion an assigned position parameter for specifying a sound source position in the stereo voice signal after conversion, corresponding to user operation.

3. The voice response system according to claim 1 wherein the voice response unit includes an assigned position parameter sending portion which supplies to the monaural/stereo conversion portion of the communication terminal an assigned position parameter for specifying a sound source position in the stereo voice signal after conversion, the assigned position parameter being determined corresponding to the monaural voice signal to be sent to the communication terminal.

4. The voice response system according to claim 1 wherein the voice response unit has a position information sending portion which sends sound source position information determined corresponding to the monaural voice signal to be sent to the communication terminal to the communication terminal, or a position information sending portion which sends the sound source position information from an external unit to the communication terminal, and the communication terminal comprises:
- a terminal position detection portion for detecting the position of the communication terminal;
- a terminal orientation detection portion for detecting the orientation of the communication terminal; and
- an assigned position parameter forming portion which forms an assigned position parameter for specifying a sound source position in the stereo voice signal after conversion, based on sound source position information provided from the voice response unit, terminal position information outputted from the terminal position detection portion and terminal orientation information outputted from the terminal orientation detection portion and supplies the assigned position parameter to the monaural/stereo conversion portion.

5. The voice response system according to claim 1 further comprising a plurality of the voice response units, wherein the communication terminal has a plurality of one-touch transmission buttons corresponding to each of the voice response units, for starting establishment of a communication link with each of the voice response units by one-touch action.

6. The voice response system according to claim 5 wherein each of the one-touch transmission buttons accommodates a light emission device and the voice response system further comprises a light emission device control server, wherein a reproduced monaural voice signal group puts the light emission device of a one-touch transmission button corresponding to an updated voice response unit into a different mode from the light emission device of another one-touch transmission button.

7. The voice response system according to claim 1 wherein the communication terminal is a telephone terminal capable of corresponding to a supply method of a plurality of assigned position parameters.

8. The voice response system according to claim 1 wherein the communication terminal further comprises a voice recognition portion and sends a recognition result to the voice response unit.

* * * * *